June 22, 1926.
D. H. COUCH
1,590,084
POWER FACTOR CONTROL OF ELECTRICAL GENERATING SYSTEMS
Filed Nov. 3, 1923
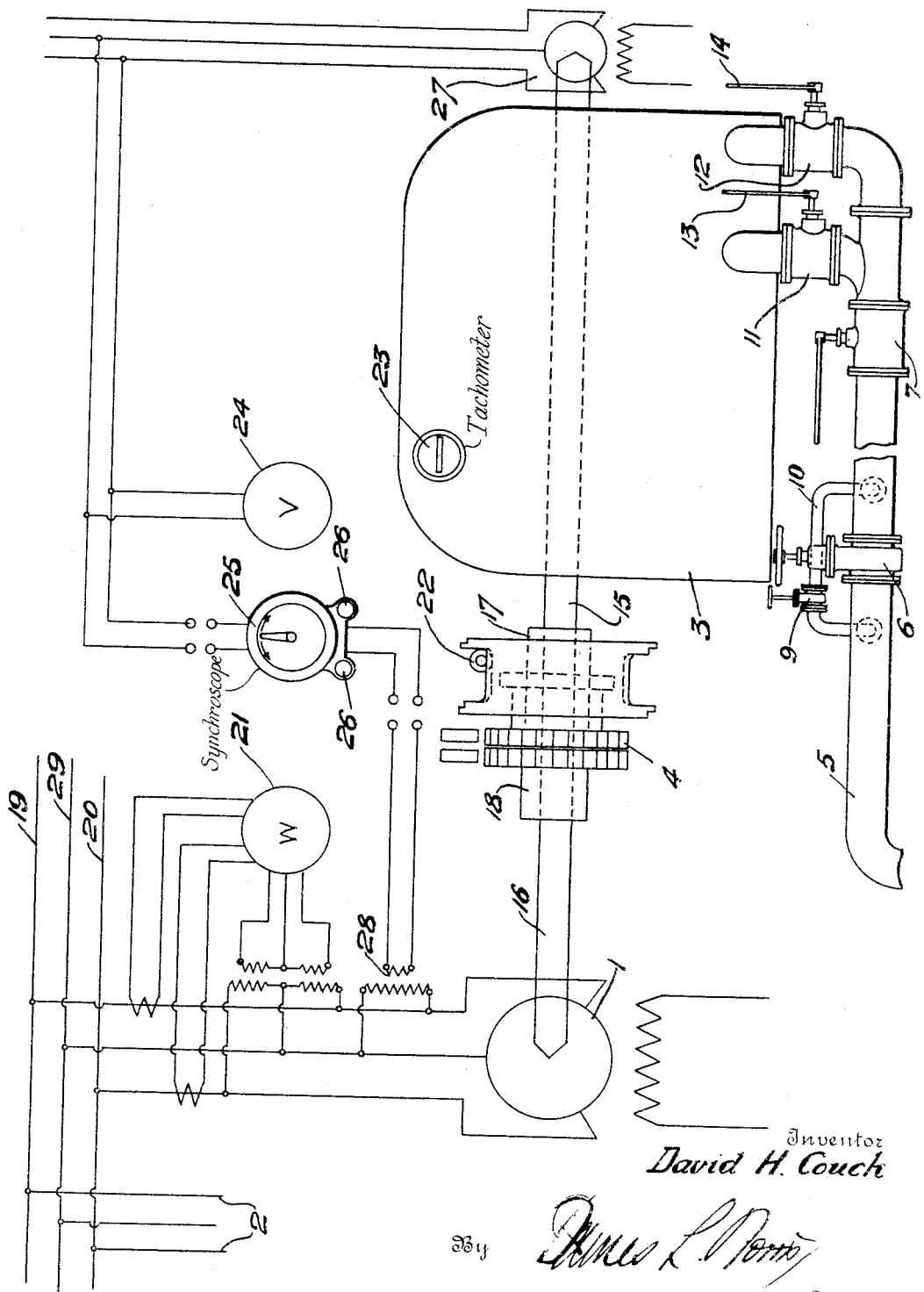
Inventor
David H. Couch
By
Attorney Patented June 22, 1926.

1,590,084

UNITED STATES PATENT OFFICE.

DAVID H. COUCH, OF WARWICK, RHODE ISLAND.

POWER-FACTOR CONTROL OF ELECTRICAL GENERATING SYSTEMS.

Application filed November 3, 1923. Serial No. 672,610.

This invention relates to an electrical generating system in which a plurality of alternating current generating units are employed to deliver energy to a common main, and has for its object the construction of a novel combination including the essential elements of such a generating system, as are now known, together with means for improving the power factor of the system by disconnecting one or more of the alternating current generators from its prime mover, while running, permitting it to operate as a synchronous motor having its field properly excited to draw a leading or lagging current from the line, as the case may require.

Another object of the invention resides in the method of operating said electrical generating system, or any equivalent system by which this desirable result may be obtained.

In the drawings, the sole figure represents diagrammatically a generating system of the proposed type in which the essential units are the alternating current generators, separate prime movers therefor and coupling elements by means of which the generators and prime movers may be connected or disengaged, together with other apparatus shown in the figure, and which will be described in due course.

One of the generators is shown at 1 and a plurality of the same are indicated by the leads 2. Said generators, or at least as many of them as it is contemplated may be floated upon the line in the manner described for the improvement of the power factor are driven by prime movers, one of which is represented at 3 and being connected to the generator by couplings one of which is shown at 4, and which may be of any appropriate type, the one shown being of specialized form and construction which, per se, has been made the subject of a companion application for patent, Serial No. 672,611, Filed November 3, 1923.

The prime mover may be of any desired type, but in the embodiment of the invention, which I have selected as a basis for the description of the present specification, is of the steam turbine type, being fed by a main steam supply pipe 5 having, preferably, a cut off valve 6 in the steam line on the boiler side of the main throttle valve 7. A small by-pass valve 9 is also preferably provided which controls a by-pass 10 around the cutoff valve 6 in order to permit of easy control of the small quantity of steam used in starting up and synchronizing the coupling. On the turbine side of the main throttle valve 7 are the individual turbine inlet valves 11 and 12 which are under the control of governor mechanism, not shown, through the connections 13 and 14 respectively. The turbine shaft 15 and the shaft 16 of the alternating current generator 1 are preferably aligned, and secured at their adjacent ends in the respective halves 17 and 18 of the coupling. Normally each of the generators is separately driven by its prime mover and the energy generated delivered to the buses 19, 20 and 29.

In explaining the principle governing the application of my invention to electrical generative systems of the type herein described, or equivalent types it may be stated that in alternating current systems the current may be in phase with the impressed voltage or it may lead or may lag behind said impressed voltage depending on the electrical characteristics of the system. When the current is out of phase with the voltage a larger current is required to produce the same amount of power because power is equal to voltage multiplied by the current, multiplied by the cosine of the angle between the voltage and current. The cosine of the angle between the voltage and current is known as the "power factor" and when the voltage and current are in phase the power factor is unity. Any lagging or leading of the current causes the power factor to be less than unity, and therefore, in constant voltage systems, to get the same amount of power at low power factors the current must be greater than if the power factor were unity. The capacity of electrical machines and lines depends upon the heating effect of the current, which heating effect is proportional to the square of the current flowing. It is therefore of great importance to keep the power factor as high as possible so that the current will be low, and thus make it practicable to get greater power output from such machines and lines.

It is well known that alternating current electrical generators are reversible in their operation, that is to say, when they are rotated by an external source of power they generate electrical energy and deliver it to the system to which they are connected or if the external source of driving power be cut off they absorb electrical energy from the system and operate as motors in synchronism with the system. When an alternating current generator is operated as a motor, it can be made to draw a current in phase with the impressed voltage, or leading or lagging behind said impressed voltage, depending upon the amount of excitation of the generator field. This is possible because the changing of the field excitation causes a change in the counter E. M. F. of the motor which change in counter E. M. F. in turn causes a change in the value and angular relation of the resultant voltage within the motor with respect to the impressed or line voltage. The angular or phase relation between the resultant voltage and the current flowing in the motor depends upon the impedance of the motor and since the impedance is practically constant, any phase swing of the resultant voltage causes a phase swing of the motor current with respect to the impressed or line voltage, or, in other words, changes the power factor of the system. If the system is operating with a lagging current, a leading current or condenser effect is required to neutralize it. A synchronous motor operating with an over-excited field will draw a leading current from the line and thereby tend to neutralize the lagging current. A synchronous motor operated for this purpose is usually termed a synchronous condenser. If the system is operating with a leading current, a lagging current is required to neutralize it. A synchronous motor operating with an under-excited field will draw a lagging current from the line and thereby tend to neutralize the leading current. A synchronous motor operated for this purpose is usually termed a synchronous reactor. Since commercial alternating current systems usually have more inductance than capacity, thus resulting in a lagging current, a leading current or condenser effect is required to correct it. In what follows the term synchronous condenser will be used to include both functions.

The conditions attending the operation of a commercial light and power plant for which the present system of power factor control is particularly adapted, are such as call for a peak load during a relatively small portion of the diurnal period, for which purpose a plurality of generating units must be maintained. As the load decreases the generators are shut off, one by one, remaining idle until the approach of the next peak load. Such generators, while inactive, are of no use to the power plant, representing so much invested capital, unemployed. But by my invention the generators instead of being shut down may be disconnected from their prime movers while running at speed, and operated as synchronous condensers to improve the power factor of the remaining generators in the manner related in the preceding paragraph. Disconnection of the generators without interrupting their synchronous relation may be accomplished by any practical means and may be particularly well performed by the novel coupling 4 which is fully described in the aforesaid companion application.

My invention, then, in its broadest terms, has now been disclosed, consisting of an electrical generating system including a plurality of alternating current generators independently driven, any number of which less than the whole number are adapted to be shifted from their functions as generators to that of synchronous condensers without interrupting their synchronous speed, for the improvement of power factor control. In the practical form suggested by the disclosure of the drawings, in which the prime mover is represented as a turbine, the separation of the coupling is effected while the alternating current machine is in regular operation as a generator, by reducing the steam supply to the turbine 3 until the wattmeter 21 indicates the necessary negative power or power input to just balance the loss in the generator 1. This shows that the turbine 3 is taking only enough steam to keep it rotating at synchronous speed but is not supplying any power to the generator which is now operating as a synchronous motor. The reduction of steam supply to this point is preferably accomplished by having the valve 9 open or practically open and the valve 6 as nearly closed as possible until the proper steam supply is secured. It is best to regulate the steam supply by the use of the valves 6 and 9, preferably without in any way interfering with the main throttle valve 7, which is usually a combination throttle and emergency stop valve and should be left free to operate on over-speed if necessary. With the steam supply properly adjusted to rotate the turbine 3 as synchronous speed without supplying power to the generator 1, the coupling operating means, which is represented diagrammatically at 22, but shown in structural detail in the said companion application is moved to separate the coupling halves thereby disconnecting the shaft 16 of the generator from the shaft 15 of the turbine. The turbine may then be shut down entirely by cutting off the steam supply at the valves 6 and 9 and also at the main throttle valve 7. The alternating current machine will then float on the line in the manner contemplated, drawing a corrective current therefrom as its field is properly excited, resultantly improving the power factor.

In picking up the alternating current machine again as a generator the speed of the incoming turbine 3 should be carefully watched to avoid overspeeding of the turbine before it is connected to the alternator 1. Tachometer 23 is provided to indicate the speed of the turbine. Voltmeter 24 will also indicate the speed of turbine and may be graduated in R. P. M. and used to corroborate tachometer 23. When the speed of the incoming turbine is nearly equal to that of the alternating current machine 1, the circuits to the synchroscope 25 or synchronizing lamps 26 are closed so as to enable the operator to manipulate the steam supply to give the same speed to the incoming turbine 3 as that of the alternating current machine to which it is being connected. The synchroscope 25 is shown to be in a circuit including a small alternating current machine 27 which is run at turbine speed and also in an opposing circuit including the transformer 28 the latter being connected in circuit with the alternating current machine 1 and being designed to step down the voltage of said machine to such value that when the small and large alternating current machines are running synchronously the voltages of the respective lines leading to the synchroscope will be equal. My invention does not concern itself with the construction of the synchroscope, devices of this character being already well known, but when the synchroscope is used in combination with the large and small alternating current machines at opposite sides of the coupling, it constitutes, as part of said combination a novel means for ascertaining more accurately than heretofore the relative speed of rotation of the two machines which are to be coupled together. When the synchroscope indicates that the speed of the turbine is the same as that of the alternating current machine the coupling is operated to move the halves thereof into interengagement, after which said alternating current machine may be run as a generator, the steam supply to the turbine being increased as the load upon the generator demands.

It is obvious that the specific details of construction and the auxiliary devices herein described are not essential to the carrying out of the invention either in its structural unity or in the method of employing the same, and that elements may be omitted or others substituted as may better serve the practical carrying out of the invention, without departing from the scope thereof as defined in the appended claims.

Having described my invention what I claim as new and desire to secure by Letters Patent, is:—

1. An electrical generating system including a plurality of prime movers each provided with a power shaft, main and auxiliary alternating current generators operatively connected to said power shaft, said main alternating current generators being synchronously driven and delivering electrical power to a common circuit, a synchroscope in circuit with the output terminals of both said main and auxiliary alternating current generators, said circuits being arranged in opposed relation, and a releasable coupling between each main alternating current generator and its prime mover.

2. In an electrical generating system including a plurality of prime movers each provided with a power shaft, main and auxiliary alternating current generators operatively connected to said power shaft, said auxiliary alternating current generator being constructed to generate current at less voltage than said main alternating current generator, said main alternating current generators being synchronously driven and delivering electrical power to a common circuit, a step-down transformer in shunt with the output terminals of said main alternating current generator designed to step-down the voltage of said generator to that of said auxiliary alternating current generator when the two are synchronously driven, a synchroscope in circuit with the output terminals of said auxiliary alternating current generator and with said transformer, said circuits being arranged in opposed relation, and a releasable coupling between each main alternating current generator and its prime mover.

3. An electrical generating system including a plurality of main alternating current generators, running synchronously and delivering electrical power to a common circuit, prime movers for independently driving said main alternating current generators, a wattmeter connected across the terminals of one of said alternating current generators, and means for regulating the power input of the prime mover by which said generator is driven to bring it to that point at which said generator is "motoring" and drawing enough electrical power from the common circuit to just balance the no-load losses of said generator running synchronously, as indicated by said wattmeter, and means for separating said alternating current generator from its prime mover at that point without disturbing its synchronous relation with the remaining alternating current generators, the alternating current generator so separated from its prime mover remaining upon the line and acting as a synchronous condenser.

4. In an electrical generating system including a plurality of alternating current generators independently driven, running synchronously, and delivering electrical power to a common circuit, the method of improving the power factor of such system which consists in regulating the power input of one of said prime movers to bring it to that point at which the generator driven by said prime mover is "motoring" and drawing enough electrical power from the common circuit to just balance the no-load losses of said generator running synchronously, and at that point separating said alternating current generator from its prime mover without disturbing its synchronous relation with the remaining alternating current generators, permitting it to remain upon the line and operate as a synchronous condenser.

In testimony whereof I have hereunto set my hand.

DAVID H. COUCH.